United States Patent [19]

Fisher

[11] Patent Number: 4,736,577

[45] Date of Patent: Apr. 12, 1988

[54] APPARATUS FOR MOVING AND TURNING OVER HAY SWATHS

[76] Inventor: Jacob M. Fisher, 3230 E. Gordon Rd., Gordonsville, Pa. 17529

[21] Appl. No.: 849,874

[22] Filed: Apr. 9, 1986

[51] Int. Cl.[4] ............................................. A01D 78/00
[52] U.S. Cl. ...................................................... 56/370
[58] Field of Search ................ 56/370, DIG. 21, 365, 56/366, 368, 372, 376, 377, 364

[56] References Cited

U.S. PATENT DOCUMENTS

| | | | |
|---|---|---|---|
| 2,390,375 | 12/1945 | Kucera | 56/370 |
| 2,391,427 | 12/1945 | Kucera | 56/370 |
| 3,496,713 | 2/1970 | Reinhardt et al. | 56/370 |
| 3,570,231 | 3/1971 | McCary et al. | 56/370 |

Primary Examiner—James A. Leppink
Assistant Examiner—Hoang C. Dang
Attorney, Agent, or Firm—Frank P. Presta

[57] ABSTRACT

Apparatus for moving hay and turning it over from a first swath to a second swath, comprising a movable platform disposed in a substantially horizontal plane and having a generally semicircular shape, the platform having an upstanding curved wall on the outer edge of the curved side and rear portions thereof. A device is mounted on one side of the front portion of the platform for picking up hay in the first swath and depositing it on the adjacent portion of the platform as it is moved forwardly. A plurality of radially outwardly extending arms with depending tines are mounted on the platform for rotation in a substantially horizontal plane above the platform. The tines engage the hay deposited on the platform and move it along the platform in an arcuate path of approximately 180° to the opposite side of the platform and over the front edge thereof to deposit the hay in an inverted position in a second swath laterally spaced from the first swath. The platform is formed of movable sections so that its width can be varied. The arms are movable upwardly to a substantially vertical position for storage or shipping of the apparatus.

8 Claims, 4 Drawing Sheets

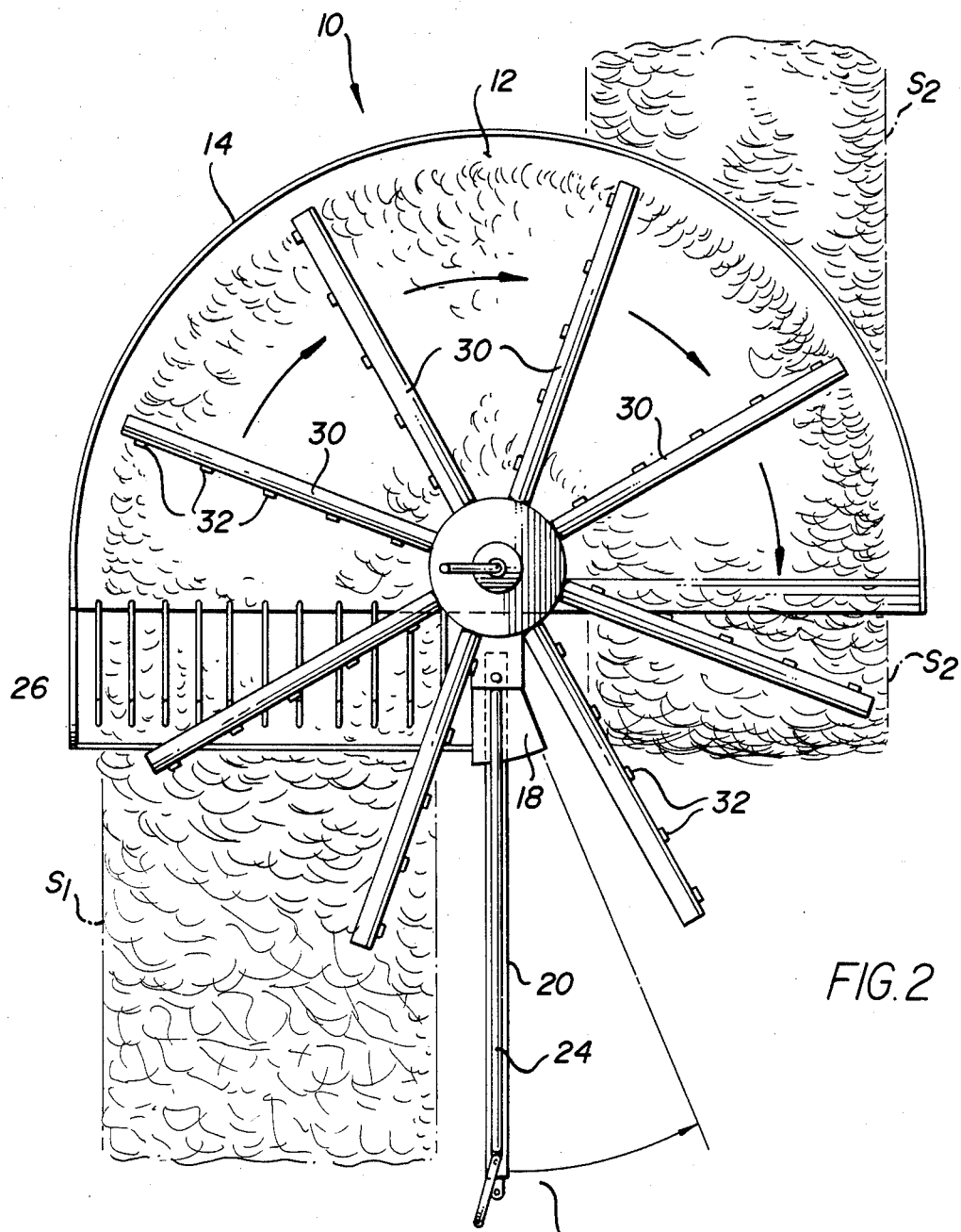
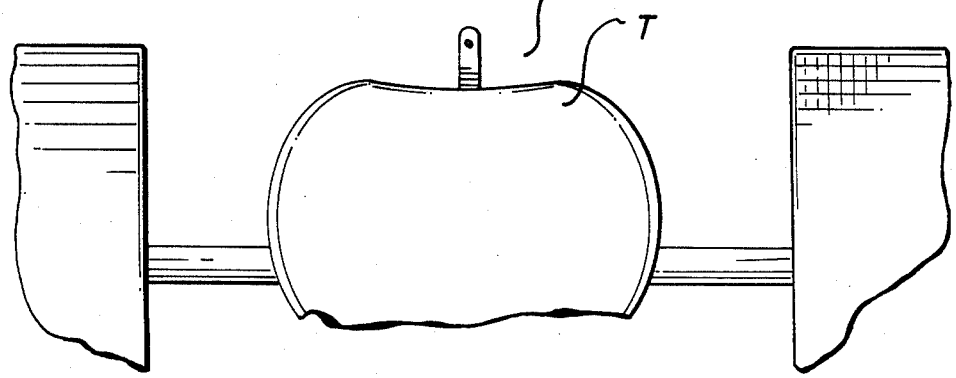
FIG. 2

APPARATUS FOR MOVING AND TURNING OVER HAY SWATHS

BACKGROUND OF THE INVENTION

The present invention relates to apparatus for moving and turning over hay swaths and, more particularly, to such apparatus that is adjustable in width so as to vary the width and location of the hay swath and to facilitate shipping of the apparatus.

At present and in the past, many different types of machines have been used for moving and/or turning over hay swaths. While such machines have generally served the purpose, they have been subject to one or more of the following disadvantages:

1. They have been complicated in construction and thus difficult and expensive to manufacture;
2. They have been difficult to operate and/or repair;
3. They have turned over the hay but have not moved it from the original row position, thereby placing the turned-over hay on the damp surface under the original row in some cases;
4. They have treated the hay roughly and have caused it to break up which lessens its nutritional value; and/or
5. They have not been effective in picking up hay or in turning it over; and/or
6. They have been bulky and not adjustable in width.

Accordingly, a need has arisen for a simple, effective and adjustable apparatus for moving and turning over hay swaths. The apparatus of the present invention fills this need.

SUMMARY OF THE INVENTION

The apparatus of the present invention is adapted to be pulled by a tractor or the like, and generally comprises a substantially flat, horizontal and semicircular platform having an upstanding wall at the curved outer edge thereof at the sides and rear of the platform. A hay pickup device of any suitable or well known construction is mounted on one side of the front portion of the platform and the other side of the front portion of the platform comprises a forwardly and downwardly curved section. The platform is comprised of pivoted sections which can be moved to vary the width of the platform. The platform is supported on a frame of any suitable construction having wheels or the like. A tongue member and a power takeoff shaft are connected to the front portion of the platform and are adapted to be connected in any suitable or conventional manner to a tractor or the like.

The power takeoff shaft is connected to a gear box in a housing mounted on the front portion of the platform near the middle thereof. Extending upwardly from the gear box is an axle on which a plurality of radially outwardly extending arms are mounted. The arms extend outwardly in a substantially horizontal plane and are of a length that is substantially the same as the radial width of the platform. Each of the arms comprises a plurality of downwardly extending, radially spaced tines which have the bottom ends thereof disposed a predetermined small distance above the surface of the platform. The upstanding axle for the arms is provided with apparatus for adjusting the height thereof so that the spacing of the tines above the platform surface can be easily adjusted. The arms are constructed so that they can be pivoted upwardly during storage and shipping of the apparatus.

In operation, the present apparatus is connected to a tractor or the like and is positioned so that the hay pickup device on one side of the front of the platform is aligned with a swath of cut hay in a field or the like. As the tractor moves the platform forwardly, the hay in the swath is picked up by the pickup device and placed on one side of the platform. Through the power takeoff shaft connected to the tractor, the radially outwardly extending arms are rotated in a substantially horizontal plane so that their tines engage the hay being placed on the platform by the pickup device and move the hay along the platform in a substantially arcuate path through an angle of approximately 180° to the front edge of the platform on the opposite side thereof. The hay is then pushed off the opposite side of the platform by the tines on the rotating arms and deposited in inverted relation in a new swath laterally spaced from the original swath. The width and position of the new swath can be varied by varying the width of the platform.

In this manner, the hay from the original swath is gently moved to form a new swath wherein the hay is turned over or inverted for better drying. Because of the gentle action of the present apparatus, the hay is fluffed for better drying as it is deposited in the new swath and is not broken up to the point that its nutritional value is adversely affected.

To minimize required space during shipping and storage, the pivoted sections of the platform are moved inwardly to reduce the width of the platform and the arms having the tines are pivoted upwardly to a substantially verticle position.

BRIEF DESCRIPTION OF THE DRAWINGS

FIG. 2 is an elevational view of the apparatus illustrated in FIG. 1;

DESCRIPTION OF THE PREFERRED EMBODIMENTS

Figure 1:
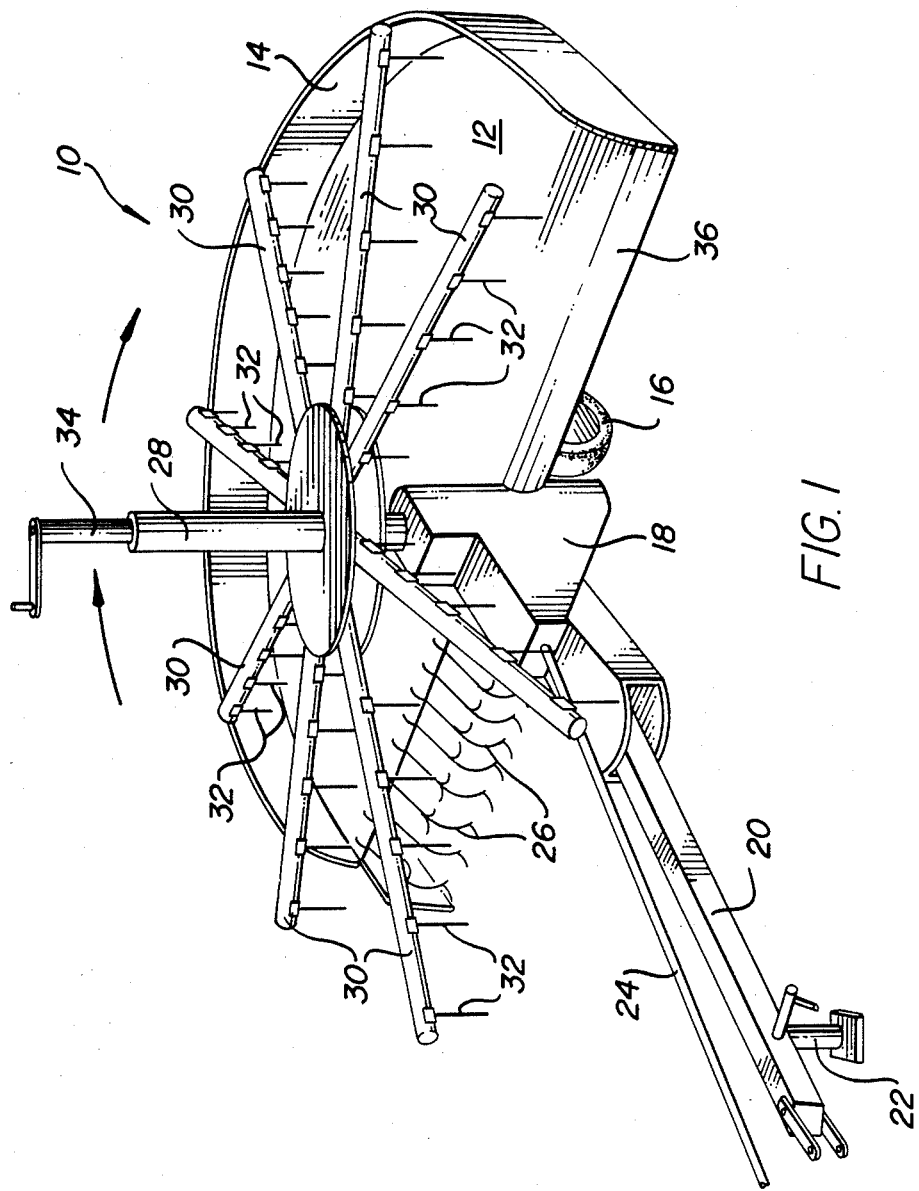
FIG. 1 is a perspective view of an apparatus for moving and turning over hay swaths constructed in accordance with the principles of the present invention.

As shown in FIGS. 1 and 2, the hay moving apparatus 10 of the present invention generally comprises a substantially semicircular platform 12 having a flat upper surface disposed in a generally horizontal plane and having an upstanding wall 14 on the curved side and rear edge thereof. The platform 12 is mounted on a frame (not shown) of any suitable construction having a plurality of wheels 16 rotatably mounted thereon.

A housing 18 (FIG. 1) or frame portion 180 (FIG. 3) is mounted on the front, substantially straight portion of the platform 12 and an elongated, forwardly extending tongue 20 is movably connected in any suitable manner to the housing 18 or frame portion 180 and is adapted to be connected at its front end to a tractor T (FIG. 2) or the like for moving the platform 12. The front portion of the tongue 20 is provided with a jack 22 of any suitable or conventional construction.

A gear box (not shown) is disposed within the housing 18 and is connected to a power takeoff shaft 24 that is adapted to be connected at its front end to the power takeoff of the tractor T. The gear box is also connected to a hay pickup device 26 of any suitable or conventional construction mounted on one side of the front portion of the platform 12. An axle 28 extending upwardly out of the housing 18 is also connected to the gear box.

A plurality of radially and laterally outwardly extending arms 30 are connected at their inner ends to the axle 28 and are disposed in a generally horizontal plane above the platform 12. Each of the arms 30 extends radially outwardly such that its outer end is closely spaced from the upstanding, curved wall 14 of the platform 12. A plurality of downwardly extending tines 32 are mounted on each arm 30 in radially spaced relation and have their lower ends disposed a predetermined distance above the surface of the platform 12.

Any suitable means (not shown) is provide for adjusting the height of the axle 28 and thus the height of the arms 30 and tines 32 relative to the platform 12. An adjusting crank 34 or the like is operatively connected to the axle 28 for adjusting the height thereof.

As shown in FIG. 1, the front poriton of the platform 12 on the side thereof opposite to that of the hay pickup device may be provided with a forwardly and downwardly curved section 36 for a purpose to be described more fully hereinafter.

In the operation of the apparatus of the present invention, the tongue 20 is connected to the hitch of a tractor or the like and the power takeoff of the tractor drives the hay pickup device 26 and the axle 28 through the power takeoff shaft 24 and the gear box (not shown) in the housing 18. Alternatively, the hay pickup device 26 and axle 28 may be connected to and driven by the ground engaging wheels 16.

The platform 12 is positioned by the tractor such that its hay pickup device 26 is aligned with a swath $S_1$ (FIG. 2) of cut hay in a field or the like. As the platform 12 is moved forwardly by the tractor, the hay pickup device 26 lifts hay in the swath $S_1$ and positions it on the adjacent side of the platform 12 where the hay is moved by the rotating arms 30 and depending tines 32 in an arcuate path along the surface of the platform through an angle of approximately 180° to the opposite side of the platform. As the hay reaches the opposite side of the platform 12, it falls over the front edge thereof into a newly formed, second swath $S_2$ that is laterally spaced from the first swath $S_1$, as shown in FIG. 2.

Because of the curved front section 36 on the platform 12 and the forward motion thereof, the hay is inverted or turned over as it is deposited in the second swath $S_2$ to fluff the hay and facilitate its drying. The positioning of the hay in a second swath on dry ground spaced from the first swath also facilitates the drying of the hay.

Figure 3:
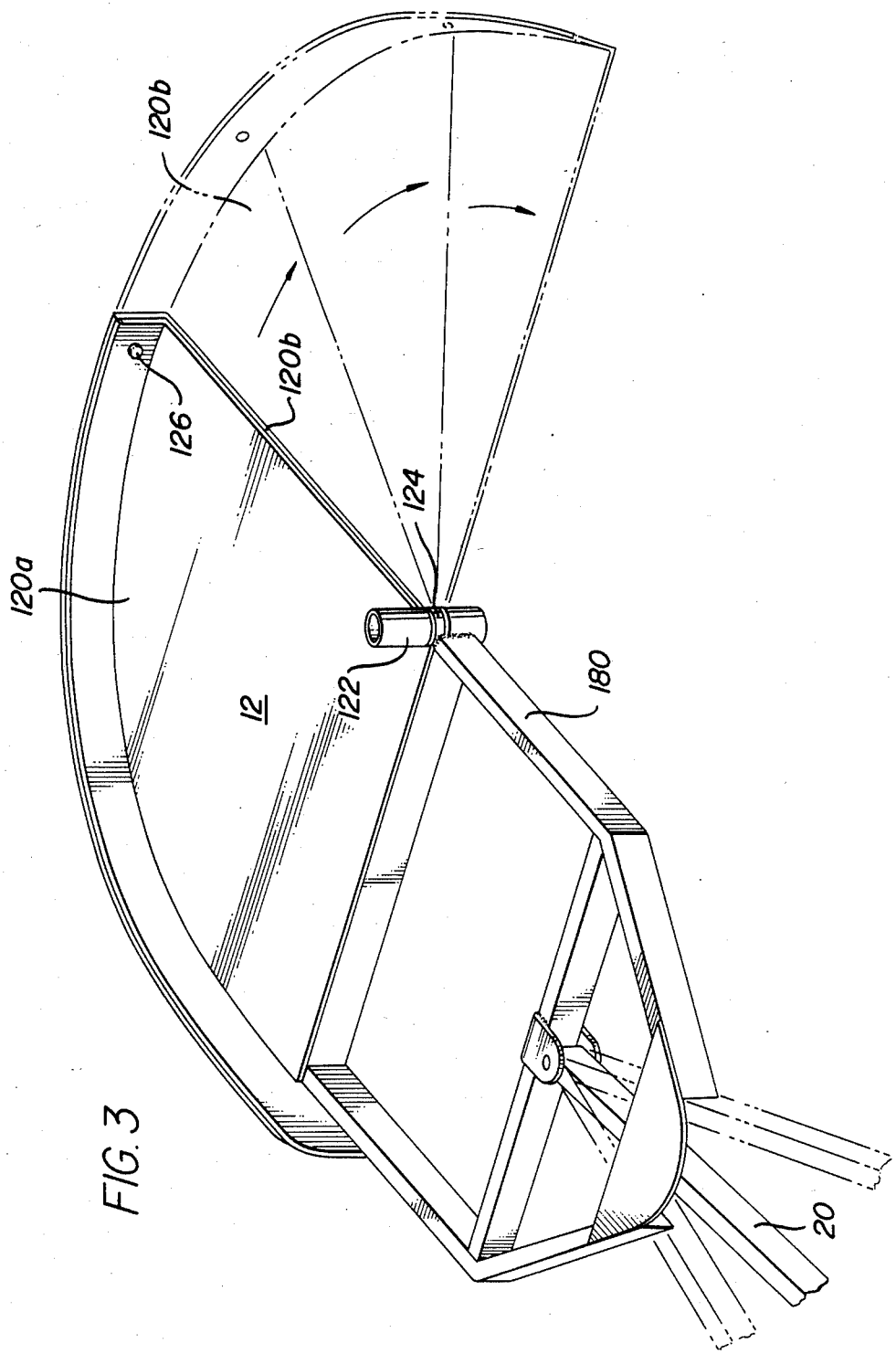
FIG. 3 is a perspective view of a portion of the apparatus shown in FIG. 1, showing the pivoted sections of the platform in relative positions.

As shown in FIG. 3, the platform 12 is formed of arcuate sections 120a and 120b that are pivotally connected together at the center portions thereof in any suitable manner, such as by tubular sections 122,124 surrounding a central post or axle. In this manner, the platform section 120b can be pivoted between the fully closed position, wherein it is disposed under the section 120a (as shown in solid lines in FIG. 3), and the fully open position (shown in broken lines in FIG. 3) wherein it is moved out from under the section 120a. By moving the platform section 120b relative to the section 120a, therefore, the width of the platform can be selectively varied to vary the location and width of the hay swath leaving the platform.

Any suitable locking means may be provided for releasably locking the platform section 120b in a selected position, such as a locking pin 126 receivable in mating apertures in the sections 120a and 120b.

Figure 4:
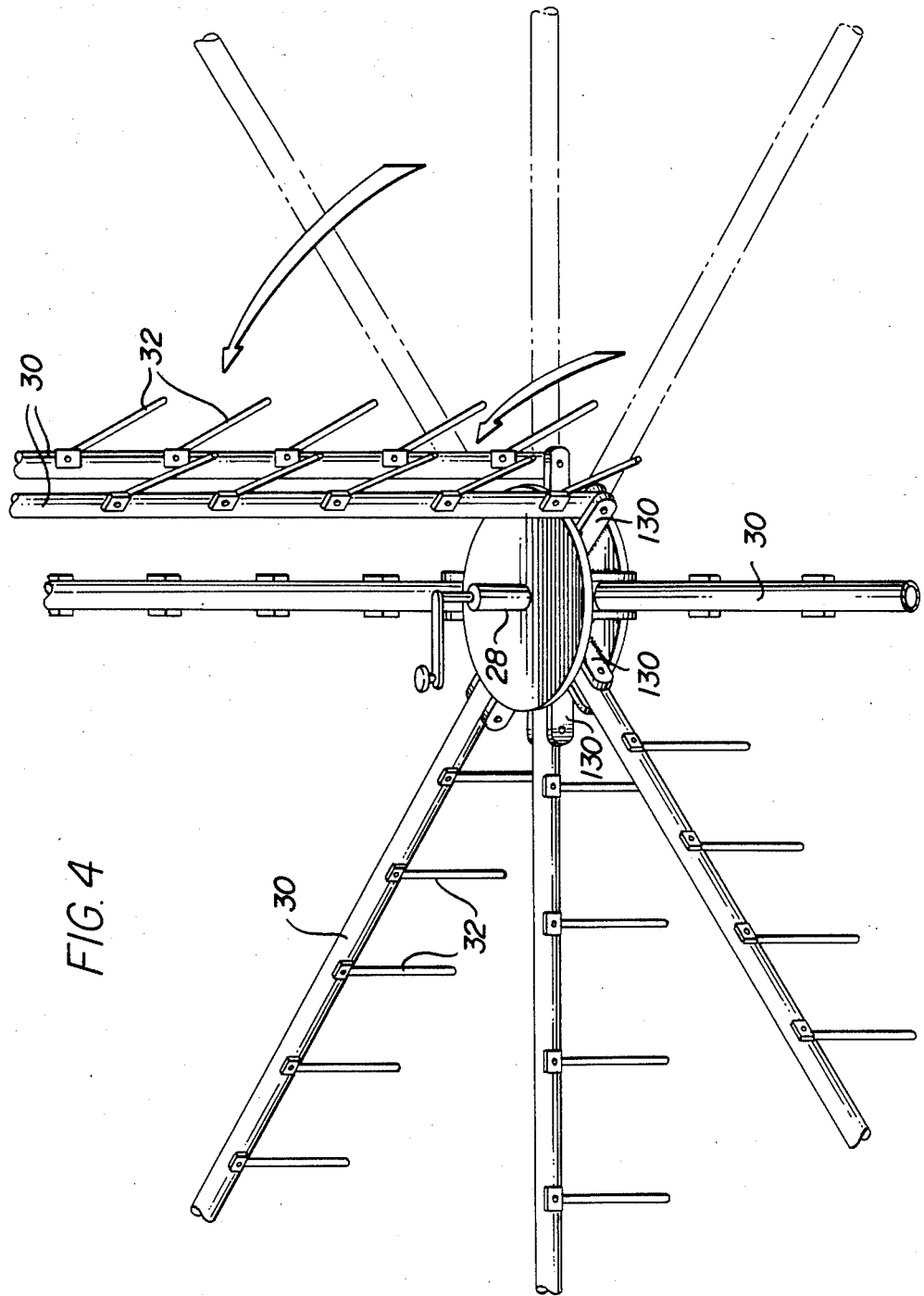
FIG. 4 is a perspective view of the arms with the tines thereon, showing some of the arms in a substantially vertical storage position.

Referring to FIG. 4, the outwardly extending arms 30 preferably are pivotally connected at their inner ends via links 130 to the axle 28 so that they can be folded upwardly during shipment or storage of the apparatus 10.

It will be readily appreciated that, through the use of the present apparatus, hay can be easily moved from one swath to a second swath spaced laterally therefrom where the hay is turned over and fluffed for better drying Because of the gentle action of the present apparatus on the hay as it is moved from the one swath to a second swath, the hay is not disturbed to an extent that causes it to break up and reduce its nutritional value. Because of the simple and adjustable construction of this apparatus, it is easy and inexpensive to manufacture, is reliable in operation and is easy to ship and store.

We claim:

1. Apparatus for moving hay and turning it over from a first swath to a second swath, comprising:
    a movable platform disposed in a substantially horizontal plane and having a substantially straight front portion and curved side and rear portions that define a generally semicircular shape, said platform having an upstanding curved wall on the outer edge of the curved side and rear portions thereof, the outer edges of said side portions defining the width of the platform, said platform comprising a plurality of sections movably connected to each other to vary the width of the platform,
    means mounted on one side of the front portion of said platform for picking up hay in the first swath and depositing it on the adjacent portion of said platform as it is moved forwardly, and
    means mounted on said platform for engaging hay deposited on said platform and moving it along the platform in an arcuate path of approximately 180° to the opposite side of the front portion of said platform and over the front edge thereof to deposit the hay in an inverted position in a second swath laterally spaced from the first swath.

2. The apparatus of claim 1 wherein the front portion of said platform on said opposite side thereof comprises a forwardly and downwardly curved section extending to said front edge thereof.

3. The apparatus of claim 1 wherein said hay engaging means comprises a plurality of generally radially outwardly extending arms that are mounted on said platform for rotation in a substantially horizontal plane disposed above said platform, each of said arms having a plurality of tines extending downwardly therefrom and positioned to engage hay deposited on said platform, said arms being movable to a substantially vertical position for storage and shipping of said apparatus.

4. The apparatus of claim 3 wherein said arms extend outwardly to a position closely spaced from said upstanding wall, and said tines extend downwardly to a position closely spaced from said platform.

5. The apparatus of claim 4 wherein an upstanding axle is rotatably mounted on said platform and said arms are connected to said axle at their inner ends.

6. The apparatus of claim 5 wherein means are provided for adjusting the vertical position of said arms and tines relative to said platform.

7. The apparatus of claim 1 wherein said platform sections are arcuate in shape and are pivotally connected together at the center portions thereof.

8. The apparatus of claim 7 wherein means are provided for releasably locking said platform sections in selected relative positions.

* * * * *